(12) United States Patent
Yamada (10) Patent No.: US 12,179,676 B2
(45) Date of Patent: Dec. 31, 2024

(54) VEHICLE EXTERIOR PART (71) Applicant: TOYODA GOSEI CO., LTD., Kiyosu (JP)

(72) Inventor: Hiroyuki Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 853 days.

(21) Appl. No.: 17/238,859

(22) Filed: Apr. 23, 2021

(65) Prior Publication Data

US 2021/0370849 A1 Dec. 2, 2021

(30) Foreign Application Priority Data

May 26, 2020 (JP) .................................. 2020-091131

(51) Int. Cl.
*B60R 13/00* (2006.01)
*B60S 1/66* (2006.01)
*H05B 3/84* (2006.01)
(52) U.S. Cl.
CPC .............. *B60R 13/005* (2013.01); *B60S 1/66* (2013.01); *H05B 3/84* (2013.01)

(58) Field of Classification Search
CPC ............ B60R 13/005; B60S 1/66; H05B 3/84
See application file for complete search history.

(56) References Cited

FOREIGN PATENT DOCUMENTS

JP 2020005057 A 1/2020
WO WO-2018074118 A1 * 4/2018 ............ B60R 13/005

* cited by examiner

Primary Examiner — Nathaniel E Wiehe
Assistant Examiner — Dilnessa B Belay
(74) Attorney, Agent, or Firm — Posz Law Group, PLC (57) ABSTRACT A vehicle exterior part includes: a decoration body including a base and a transparent plastic layer arranged on an outer side of the base; a heater seat including a seat base and a heat wire; and a connector pin. The heater seat includes: a heat-generating body arranged on an outer side of the transparent plastic layer; and an extension extending from an edge of the heat-generating body. A section of the heater wire in the extension is a terminal electrically connected to the connector pin. An outer part of the connector pin is embedded in a periphery of the base. An inner part of the connector pin is exposed from the base. The extension extends inward in an outer-inner direction in the periphery of the base. The terminal of the heater wire is joined to the outer part of the connector pin in the periphery of the base.

5 Claims, 4 Drawing Sheets

VEHICLE EXTERIOR PART

BACKGROUND

1. Field

The present disclosure relates to a vehicle exterior part that decorates a vehicle, such as an emblem, an ornament, or a mark.

2. Description of Related Art

In vehicles equipped with a millimeter wave radar device, the millimeter wave radar device transmits millimeter waves toward the outside of the vehicle. The millimeter waves that have struck and have been reflected by an object outside the vehicle including the leading vehicle, pedestrians, and the like are received by the millimeter wave radar device. The transmitted and received millimeter waves are used to recognize the object and detect the distance and relative speed between the vehicle and the object.

Figures 7A, 7B:
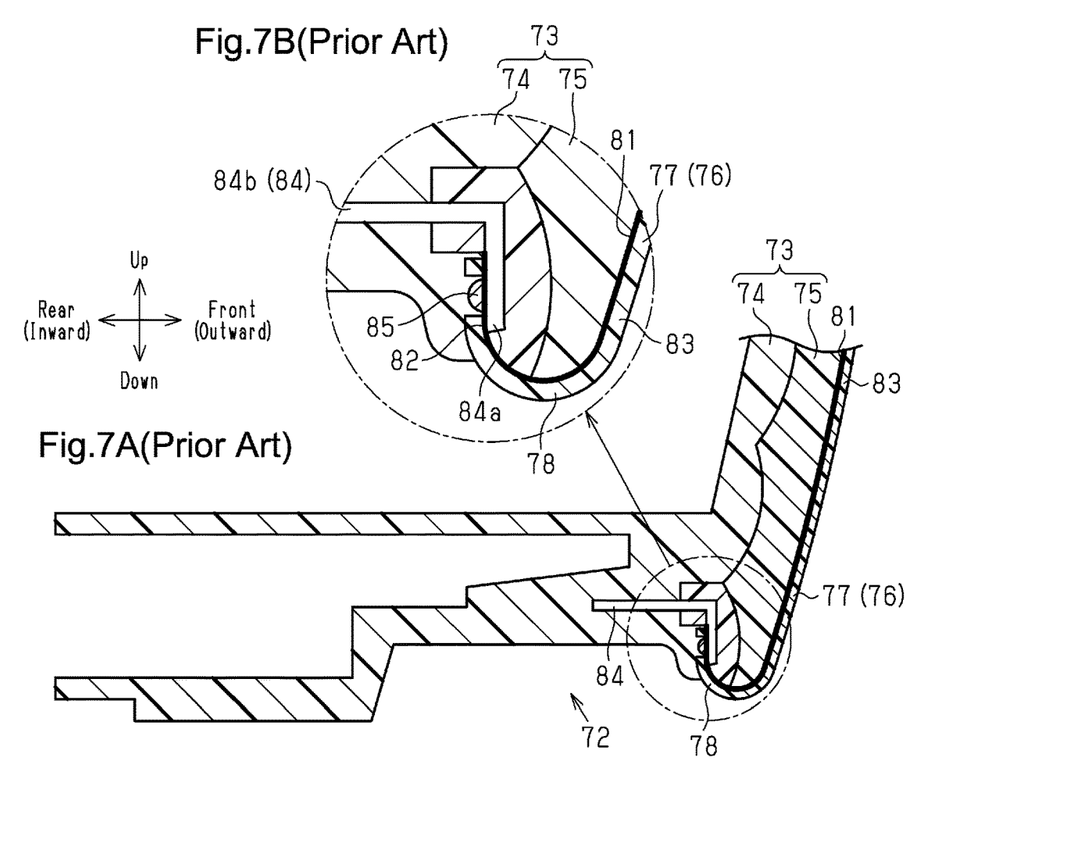
FIG. 7A is a partial cross-sectional side view showing the lower part of a conventional emblem.
FIG. 7B is an enlarged partial cross-sectional side view showing a part of FIG. 7A.

The vehicle includes a vehicle exterior part, such as a front grille or an emblem, in front of the millimeter wave radar device in the transmission direction of millimeter waves. FIGS. 7A and 7B show an emblem 72, which is a vehicle exterior part. As shown in FIGS. 7A and 7B, the emblem 72 includes a decoration body 73. The decoration body 73 makes the millimeter wave radar device unseen and permits the passage of millimeter waves. The decoration body 73 includes a base 74 and a transparent plastic layer 75. The base 74 is a part of the inner side of the decoration body 73. The transparent plastic layer 75 is a part of the outer side of the decoration body 73.

In the emblem 72, when ice and snow adhere to its ornamental surface (outer surface), millimeter waves attenuate. This lowers the detection performance of the millimeter wave radar device. To cope with this problem, the emblem 72 may additionally include a snow-melting function.

The snow-melting function of the emblem 72 is added by, for example, arranging a heater seat 76 and a connector pin 84 on the decoration body 73. The heater seat 76 includes a seat base 83 and a heater wire 81. The heater wire 81 is arranged on the inner surface of the seat base 83. The heater wire 81 generates heat when energized. The connector pin 84 provides a place to which a power supplying device is coupled. The heater wire 81 is electrically connected to this place. The heater seat 76 includes a heat-generating body 77 and an extension 78. The heat-generating body 77 is arranged on the outer side of the transparent plastic layer 75. The extension 78 extends from the edge of the heat-generating body 77. The power supplied from the device is supplied to the heater wire 81 through the connector pin 84.

In the emblem 72, the heater wire 81 generates heat when energized. Thus, even if ice and snow adhere to the ornamental surface (outer surface) of the emblem 72, the heat generated by the heater wire 81 melts the ice and snow. This prevents millimeter waves from being attenuated due to the adhesion of the ice and snow.

The conventional emblem 72 is problematic as to how a terminal 82, which is a section of the heater wire 81 in the extension 78, is joined to the connector pin 84.

The structure of joining the terminal to the connector pin includes a structure in which the joining is performed on the outer side of the transparent plastic layer 75 (not shown) and a structure in which the joining is performed on the inner side of the transparent plastic layer 75 (refer to FIGS. 7A and 7B). In the former structure, a portion of the connector pin is exposed to the outer side of the transparent plastic layer. The extension is arranged on the outer side of the transparent plastic layer. On the outer side of the decoration body, the terminal is joined to the exposed portion of the connector pin.

In the latter structure, as shown in FIGS. 7A and 7B, the connector pin 84 includes an inner part 84b and an outer part 84a. The inner part 84b extends in an outer-inner direction. The outer part 84a extends from the end of the inner part 84b on the outer side in a direction that is orthogonal to the outer-inner direction. The extension 78 is bent at approximately 180 degrees relative to the heat-generating body 77 such that the extension 78 extends over, for example, the perimeter of the transparent plastic layer 75 and the outer part 84a and is routed along the inner side of the transparent plastic layer 75. The routed part of the terminal 82 is joined to the outer part 84a of the connector pin 84 by a joint 85.

Japanese Laid-Open Patent Publication No. 2020-5057 discloses an example of a technique of layering the heater seat on the outer side of the decoration body.

When the terminal is joined to the connector pin on the outer side of the transparent plastic layer as described above, the joined portion needs to be hidden by an additional member in order to avoid making the emblem less aesthetically appealing. Further, when the terminal 82 is joined to the connector pin 84 on the inner side of the transparent plastic layer 75, bending the terminal 82 of the heater wire 81 to a large extent may break the heater wire 81.

Such problems may occur not only in the millimeter wave radar device but also in a vehicle exterior part which is incorporated in a vehicle including a device transmitting and receiving electromagnetic waves used to detect an object outside the vehicle and in which a heater seat is arranged on the outer side of a decoration body. The same problems may occur also in a vehicle exterior part which is incorporated in a vehicle that does not include a device transmitting and receiving electromagnetic waves and in which a heater seat is arranged on the outer side of a decoration body.

SUMMARY

It is an object of the present disclosure to provide a vehicle exterior part capable of preventing a heater wire from breaking and capable of improving the aesthetic appeal of the vehicle exterior part without the arrangement of an additional member on the outer side of a transparent plastic layer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A vehicle exterior part that solves the above-described problem includes: a decoration body configured to decorate a vehicle; a heater seat including a seat base and a heater wire, the heater wire being arranged on an inner surface of the seat base and generating heat when energized; and a connector pin configured to be coupled to a device used to supply power. The decoration body includes a base and a transparent plastic layer arranged on an outer side of the base. The heater seat includes a heat-generating body and an extension, the heat-generating body being arranged on an outer side of the transparent plastic layer, the extension extending from an edge of the heat-generating body. A section of the heater wire in the extension is a terminal that is electrically connected to the connector pin. An outer part of the connector pin is embedded in a periphery of the base. An inner part of the connector pin is exposed from the base. The extension extends inward in an outer-inner direction in the periphery of the base. The terminal of the heater wire is joined to the outer part of the connector pin in the periphery of the base.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle exterior part applied to an emblem 15 for a vehicle 10 according to an embodiment will now be described with reference to FIGS. 1 to 6.

In the following description, the direction in which the vehicle 10 travels forward will be referred to as the front, and the reverse direction will be referred to as the rear. The up-down direction refers to the up-down direction of the vehicle 10, and the left-right direction refers to the width direction of the vehicle 10 that coincides with the left-right direction when the vehicle 10 is moving forward. In each of the figures, the dimensions of components of the emblem are changed such that the components are recognizable.

Figure 3:
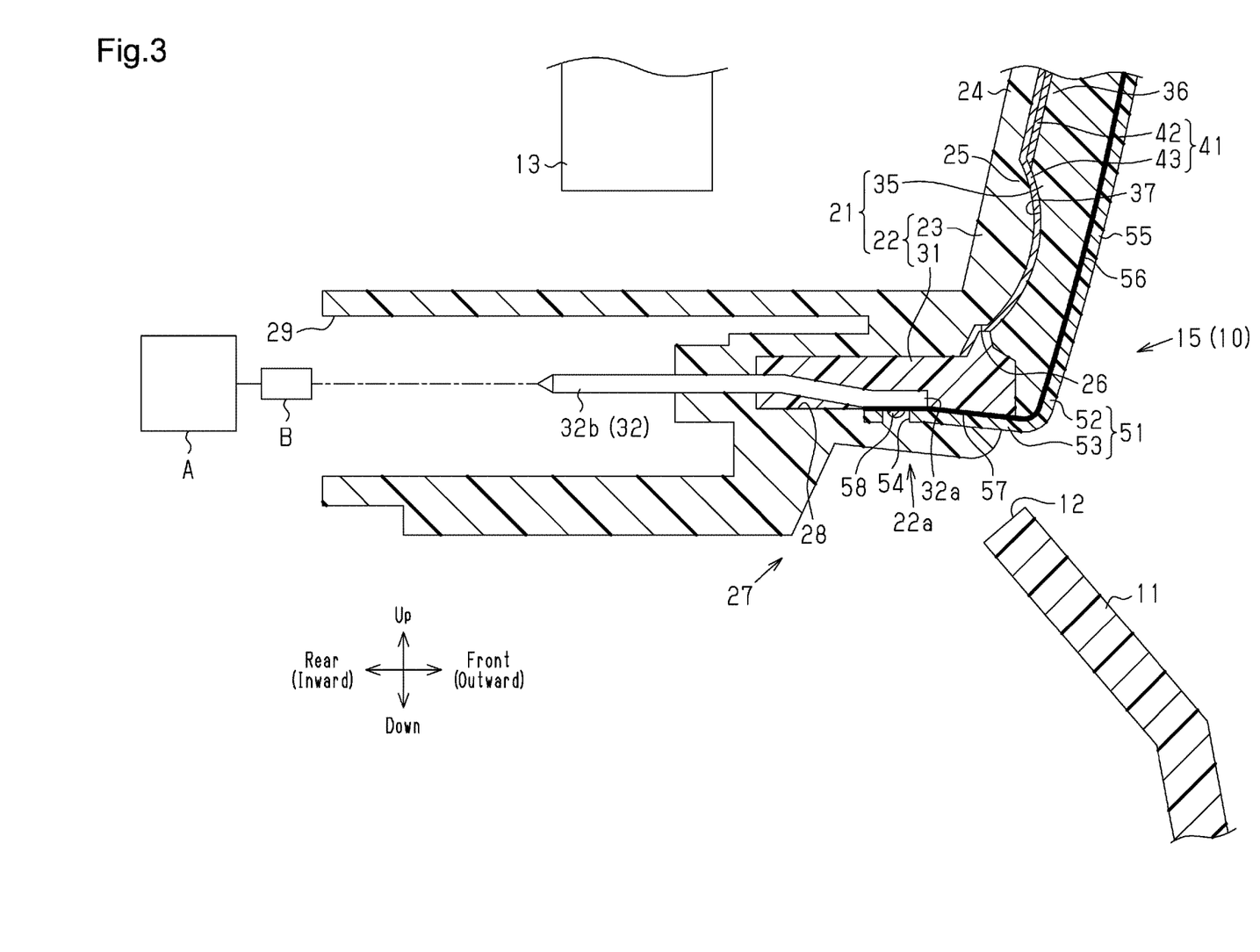
FIG. 3 is a partial cross-sectional side view showing the lower part of the emblem and a part of the front grille in the embodiment.

As shown in FIG. 3, the vehicle 10 includes a front-monitoring millimeter wave radar device 13. The millimeter wave radar device 13 is located behind a front grille 11 in the middle of the front part of the vehicle 10 in the width direction. The millimeter wave radar device 13 is configured to transmit millimeter waves in electromagnetic waves toward the front and receive the millimeter waves that have struck and have been reflected by an object outside the vehicle 10. Millimeter waves are radio waves with wavelengths of 1 mm to 10 mm and frequencies of 30 GHz to 300 GHz.

In the same manner as a general front grille, the thickness of the front grille 11 is not fixed. In the front grille 11, a metal plating layer may be formed on the outer surface of a plastic base. Thus, the front grille 11 interferes with the millimeter waves that have been transmitted or reflected. Accordingly, the front grille 11 includes a window 12 at the front of the millimeter wave radar device 13 in the transmission direction of the millimeter waves. FIG. 3 shows the lower part of the window 12.

The emblem 15 of the present embodiment is arranged at the window 12. To describe the emblem 15, the side of the ornamental surface (the right side in FIG. 3) is referred to as an outer side, and the side opposite to the ornamental surface (the left side in FIG. 3) is referred to as an inner side.

The emblem 15 is arranged upright such that its outer surface is directed toward the front of the vehicle 10 and its inner surface is directed toward the rear of the vehicle 10. In this arrangement, the outer side of the emblem 15 corresponds to the front side of the vehicle 10 and the inner side of the emblem 15 corresponds to the rear side of the vehicle 10.

Thus, in the description of a single emblem 15, the terms "outer" and "inner" are used to specify the direction corresponding to the front-rear direction of the vehicle. The same applies to the description of the emblem 15 attached to the vehicle 10.

The emblem 15 includes a decoration body 21 and a heater seat 51. Each of the components of the emblem 15 will now be described.

Decoration Body 21

Figure 1:
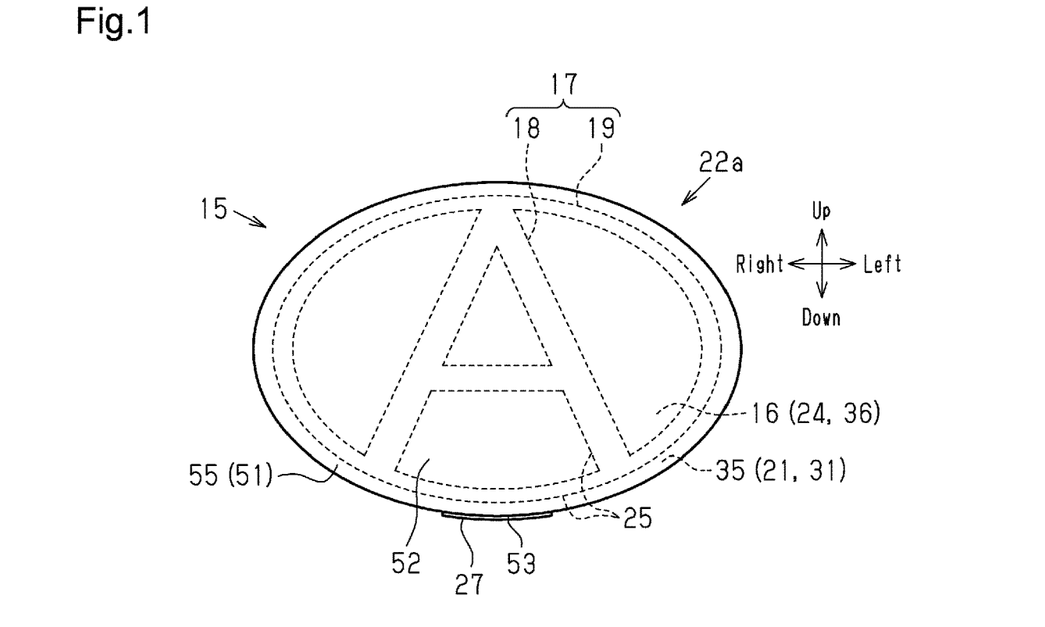
FIG. 1 is a front view showing a vehicle exterior part applied to a vehicle emblem according to an embodiment.

As shown in FIGS. 1 and 3, the decoration body 21 is attached to the front side of the vehicle 10 in the direction in which millimeter waves are transmitted from the millimeter wave radar device 13 to decorate the vehicle 10. The main part of the decoration body 21 has the form of a plate that is horizontally elongated and substantially elliptic. The main part of the decoration body 21 permits the passage of millimeter waves.

The decoration body 21 includes a base 22, a transparent plastic layer 35, and a decorative layer 41. The base 22 is a part of the inner side of the decoration body 21. The base 22 includes a base body 23 and a frame 31. The base body 23 is the framework of the base 22. The frame 31 is embedded in the periphery of the base body 23.

The base body 23 is made of plastic, such as acrylonitrile-ethylene-styrene (AES) copolymer plastic, so as to be colored. The outer part of the base body 23 includes a general portion 24 and a projection 25. The general portion 24 intersects obliquely with respect to the outer-inner direction and is substantially flat. The projection 25 protrudes outward from the general portion 24. The general portion 24 corresponds to a background region 16 of the emblem 15 in FIG. 1, and the projection 25 corresponds to a pattern region 17 of the emblem 15. The pattern region 17 includes a character part 18 and an annular part 19. The character part 18 includes the character "A." The annular part 19 surrounds the character part 18.

As shown in FIG. 3, the periphery of the base body 23 includes an annular recess 26. The annular recess 26 opens in the outer surface of the periphery and is recessed inward. The annular recess 26 is annular and substantially elliptic in correspondence with the edge of the base body 23.

The lower part of the base body 23 includes an inwardly-protruding socket 27. A plug B of a device A, which is used to supply power, is removed from and inserted into the socket 27. The outer part of the socket 27 includes a recess 28, which extends in the outer-inner direction. The recess 28 is continuous with the annular recess 26. In addition, the socket 27 includes a recess 29, which opens in the inner surface of the socket 27 and is recessed outward.

Instead of the AES plastic, the base body 23 may be made of, for example, acrylonitrile-styrene-acrylate (ASA) copolymer plastic, polycarbonate (PC) plastic, or polymer alloy of PC plastic and acrylonitrile-butadiene-styrene (ABS) copolymer plastic.

The frame 31 is arranged along the periphery of the base body 23 so that the frame 31 has a shape that is annular and substantially elliptic (refer to FIG. 1). The frame 31 is mostly provided (embedded) in the annular recess 26 so as to fill the annular recess 26. The lower part of the frame 31 is partly provided (embedded) in the recess 28 of the socket 27 so as to fill the recess 28. The frame 31 is made of a composite material of PC plastic and carbon black such that the frame 31 has a black color.

The base 22 includes a periphery 22a. The lower part of the periphery 22a of the base 22 is provided with a connector pin 32, which extends in the outer-inner direction. The connector pin 32 includes an outer part 32a. The outer part 32a is embedded in the frame 31 such that a portion of the outer part 32a is exposed from the peripheral surface of the frame 31. The connector pin 32 includes an inner part 32b. In the same manner as the outer part 32a, the inner part 32b extends in the outer-inner direction. A portion of the inner part 32b is exposed from the base 22 in the recess 29.

Attachment portions (not shown) are arranged at multiple positions of the edge of the inner surface of the base 22 (base body 23) to attach the emblem 15 to the front grille 11 or the vehicle body. The attachment portions include, for example, clips, screws, and engagement tabs.

The transparent plastic layer 35 is a part of the outer side of the decoration body 21. The transparent plastic layer 35 is made of PC plastic so as to be transparent. The term "transparent" in this specification includes not only a colorless and transparent state, but also a colored and transparent state. The same applies to a seat base 55, which will be described later. The shape of the inner part of the transparent plastic layer 35 corresponds to the shape of the outer part of the base body 23. That is, the inner part of the transparent plastic layer 35 includes a general portion 36 at the position located on the outer side of the general portion 24 of the base body 23. The general portion 36 is substantially flat and intersects obliquely with respect to the outer-inner direction. The inner part of the transparent plastic layer 35 also includes a recess 37 at the position located on the outer side of the projection 25 of the base body 23. The recess 37 is recessed outward from the general portion 36. Instead of the above-described PC plastic, the transparent plastic layer 35 may be made of transparent plastic such as polymethyl methacrylate (PMMA) plastic.

The decorative layer 41 is located between the base 22 and the transparent plastic layer 35 in a region surrounded by the frame 31. The decorative layer 41 permits the passage of millimeter waves. The decorative layer 41 includes a colored decorative layer 42 and a brilliant decorative layer 43. The colored decorative layer 42 has a dark color, such as black or blue. The colored decorative layer 42 is arranged on the inner surface of the general portion 36.

The brilliant decorative layer 43 is made of a metal material, such as indium (In). The brilliant decorative layer 43 is provided on the wall surface of the recess 37 of the transparent plastic layer 35, on a part of the frame 31, and on the entire inner surface of the colored decorative layer 42 such that the brilliant decorative layer 43 has an island-like structure. In the island-like structure, instead of metal coatings being continuous on the entire surfaces, a large number of fine metal coatings are densely laid out such that they are slightly spaced apart from one another like an island or they are in partial contact with one another like an island. In such a structure, the brilliant decorative layer 43 has a non-continuous structure, and therefore has a high electrical resistance and permits the passage of millimeter waves. The brilliant decorative layer 43 may be made of a metal material other than indium.

In the decoration body 21, the frame 31 is welded to the base body 23 and the transparent plastic layer 35 so that the base body 23 and the transparent plastic layer 35 are coupled to each other.

In the decoration body 21, the region through which millimeter waves are passed have a fixed thickness.

Heater Seat 51

Figure 2:
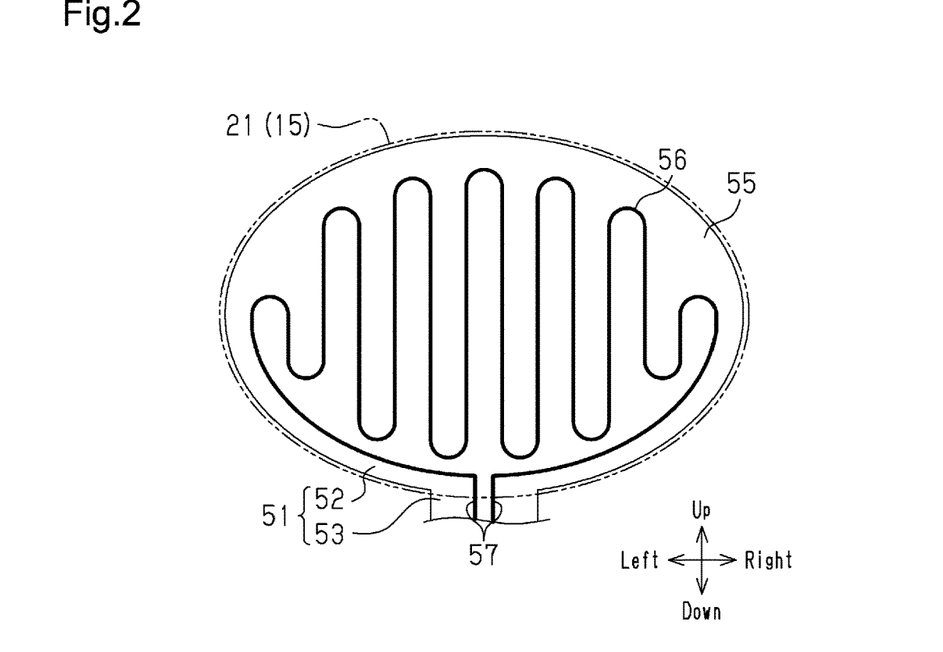
FIG. 2 is a partial rear view showing the heater seat in the embodiment.

As shown in FIGS. 2 and 3, the heater seat 51 includes the seat base 55 and a heater wire 56. The seat base 55 is made of a transparent plastic material, such as PC plastic. The heater wire 56 is arranged on the inner surface of the seat base 55. The heater wire 56 is made of a metal material that generates heat when energized.

The heater seat 51 includes a heat-generating body 52 and an extension 53. The extension 53 extends from the lower edge of the heat-generating body 52, which is a part of the edge of the heat-generating body 52. In the same manner as the decoration body 21, the heat-generating body 52 has a substantially elliptic shape that is horizontally elongated. The heat-generating body 52 is layered on the outer side of the decoration body 21 (transparent plastic layer 35). In the heat-generating body 52, the heater wire 56 is repeatedly bent like a waveform. Such an arrangement avoids situations in which the passage of millimeter waves is hindered by the heater wire 56.

The heater seat 51 is bent at the boundary between the heat-generating body 52 and the extension 53 such that the angle formed by the heat-generating body 52 and the extension 53 is obtuse. The heater wire 56 is arranged also on the extension 53. This section of the heater wire 56 defines a terminal 57.

The extension 53 extends inward in the outer-inner direction in the periphery 22a of the base 22. More specifically, the extension 53 is arranged between the peripheral surface of the frame 31 and the surfaces of the inner walls of the annular recess 26 and the recess 28 in the base body 23. In other words, the extension 53 is arranged in the periphery 22a of the base 22 and at the boundary between the frame 31 and the base body 23. In the present embodiment, the extension 53 is arranged in the periphery 22a of the base 22 and is substantially parallel to the edge of the periphery 22a.

As described above, a portion of the outer part 32a of the connector pin 32 is exposed from the peripheral surface of the frame 31. A portion of the extension 53 overlaps the exposed portion of the outer part 32a from the peripheral side. The portion of the extension 53 which overlaps the exposed portion of the outer part 32a has a hole 54. The terminal 57 of the heater wire 56 is joined to the exposed portion of the outer part 32a of the connector pin 32 by a joint 58. The joint 58 is provided in the hole 54 and made of a solder alloy. The joining causes the terminal 57 to be electrically connected to the outer part 32a in the periphery 22a of the base 22.

The terminal 57 does not have to be joined (soldered) to the outer part 32a using the solder alloy. Instead, the terminal 57 may be joined to the outer part 32a using an electrically conductive adhesive, welded to the outer part 32a, or pressed in contact with (for example, crimped to) the outer part 32a.

The emblem 15 is arranged upright in the window 12 and attached to the front grille 11 or the vehicle body at the attachment portions.

When the plug B of the device A is inserted into the socket 27 at the lower part of the base 22 from the inner side of the emblem 15, the heater wire 56 is electrically connected to the device A.

The method for manufacturing the emblem 15 will now be briefly described with reference to FIGS. 4 to 6.

Figure 4:
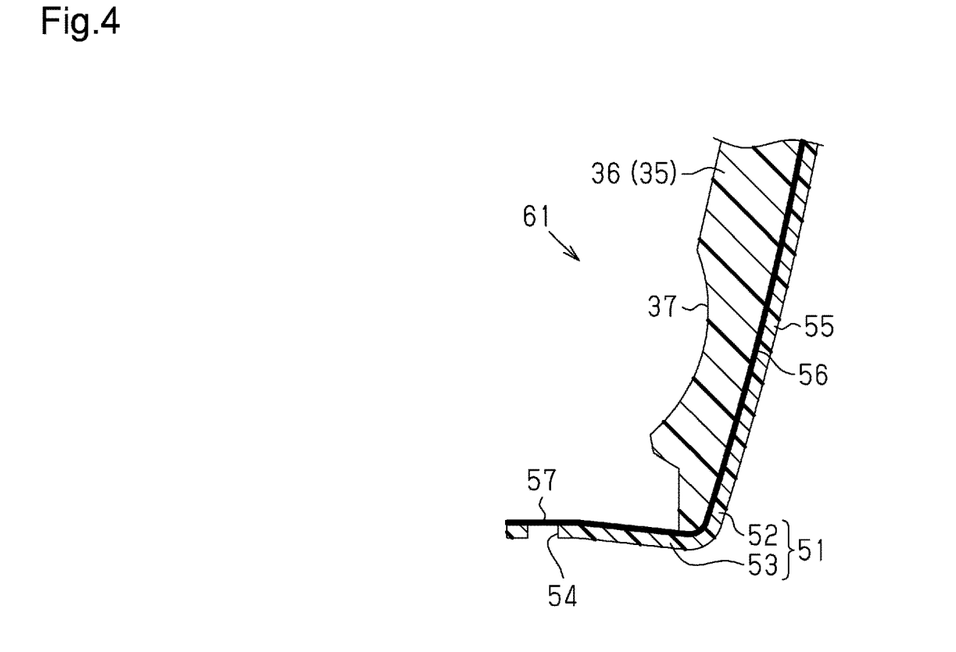
FIG. 4 is a partial cross-sectional side view showing an intermediate molded body during the manufacturing of the emblem in the embodiment.

First, a plastic mold is used to perform insert-molding so that an intermediate molded body 61 is formed as shown in FIG. 4. That is, the heater seat 51 is arranged in the plastic mold as an insert. Next, a plastic material (PC plastic) in a molten state is injected into the cavity of the plastic mold so that the cavity is filled with the plastic material. When the molten resin hardens, the transparent plastic layer 35, which includes the general portion 36 and the recess 37, is formed on the inner side of the heater seat 51. This forms the intermediate molded body 61, which includes the transparent plastic layer 35 and the heater seat 51, as shown in FIG. 4.

Figure 5:
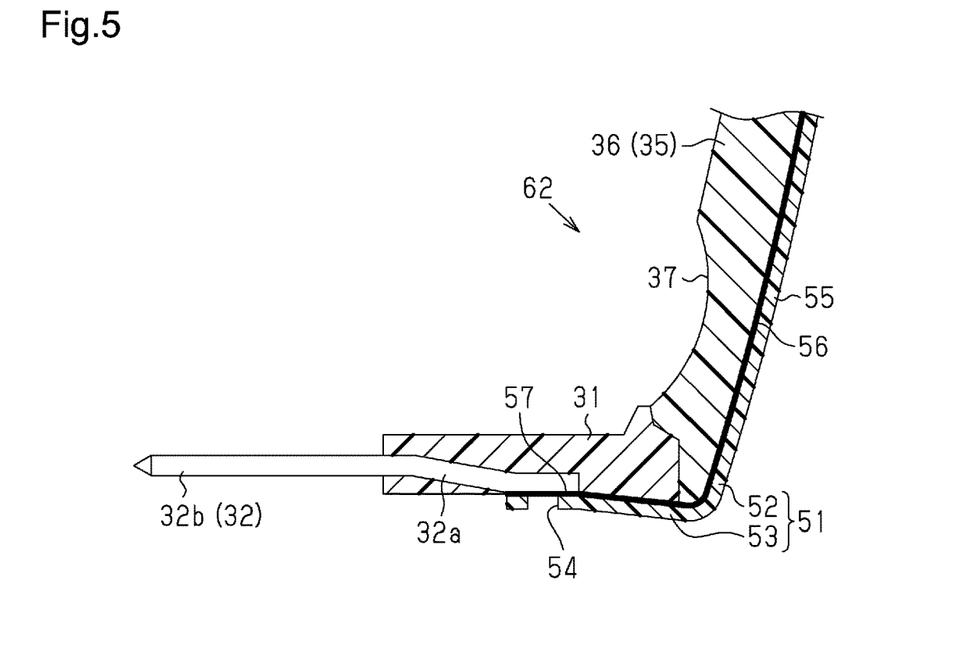
FIG. 5 is a partial cross-sectional side view showing another intermediate molded body in the embodiment.
Figure 6:
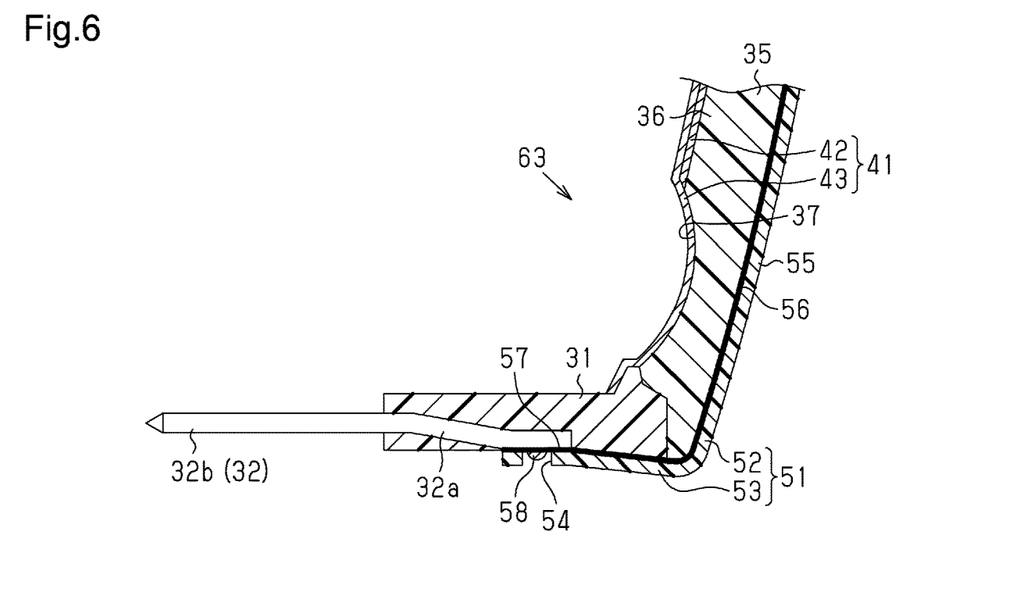
FIG. 6 is a partial cross-sectional side view showing a further intermediate molded body in the embodiment.

Subsequently, another plastic mold is used to perform insert-molding so that an intermediate molded body 62 is formed as shown in FIG. 5. That is, the intermediate molded body 61 of FIG. 4 and the connector pin 32 are arranged in the plastic mold as inserts. Next, a material (a composite material of PC plastic and carbon black) in a molten state is injected into the cavity of the plastic mold so that the cavity is filled with the plastic material. When the molten composite material hardens, the frame 31 is formed in close contact with the heater seat 51 and the transparent plastic layer 35 in a state where the outer part 32a of the connector pin 32 embedded. This forms the intermediate molded body 62, which includes the transparent plastic layer 35, the heater seat 51, the frame 31, and the connector pin 32, as shown in FIG. 5. In the intermediate molded body 62, a portion of the outer part 32a of the connector pin 32 is exposed from the peripheral surface of the frame 31. The extension 53 of the heater seat 51 overlaps the exposed portion of the outer part 32a of the connector pin 32 from the peripheral side so that a part of the terminal 57 of the heater wire 56 is in contact with the exposed portion.

Then, the intermediate molded body 62 of FIG. 5 is removed from the plastic mold. Referring to FIG. 6, soldering is performed to join the terminal 57 to the outer part 32a through the hole 54 of the extension 53. The hole 54 includes the joint 58, which is made of a solder alloy. The joint 58 electrically connects the heater wire 56 to the exposed portion of the outer part 32a of the connector pin 32 at the terminal 57.

Printing (such as screen printing), hot stamping, or the like is performed to form the colored decorative layer 42 on the general portion 36 of the transparent plastic layer 35. Next, sputtering or vapor deposition of a metal material such as indium is performed on the wall surface of the recess 37 of the transparent plastic layer 35, on a part of the frame 31, and on the entire inner surface of the colored decorative layer 42 to form the brilliant decorative layer 43. Thus, the decorative layer 41, which includes the colored decorative layer 42 and the brilliant decorative layer 43, is formed on the inner surface of the transparent plastic layer 35 and on a part of the frame 31. This forms an intermediate molded body 63 as shown in FIG. 6.

Next, a further plastic mold is used to perform insert-molding so that the base body 23 is formed. That is, the intermediate molded body 63 of FIG. 6 is arranged in the plastic mold as an insert. Then, a plastic material (AES plastic) in a molten state is injected into the cavity of the plastic mold so that the cavity is filled with the plastic material. When the molten resin hardens, the base body 23 is formed in close contact with a part of the frame 31, the decorative layer 41, the extension 53 of the heater seat 51, and a part of the connector pin 32 as shown in FIG. 3. This forms the emblem 15 as intended.

The operation of the above-described present embodiment will now be described. The advantages resulting from the operation will also be described.

In the present embodiment, as shown in FIG. 3, the outer part 32a of the connector pin 32 and the terminal 57 of the extension 53 in the heater seat 51 are joined to each other in the periphery 22a of the base 22. The joined portion of the outer part 32a and the terminal 57 are covered by the periphery 22a. This prevents the joined portion from making the emblem 15 aesthetically unappealing and therefore eliminates the need to hide the joined portion using an additional member, unlike the case where joining is performed on the outer side of the transparent plastic layer 35.

The extension 53 extends inward in the outer-inner direction in the periphery 22a and is bent to a smaller extent than when joining is performed on the inner side of the transparent plastic layer 75 (refer to FIGS. 7A and 7B). To inwardly extend the extension 53, the extension 53 is merely bent at an angle smaller than 90 degrees such that the angle formed relative to the heat-generating body 52 is obtuse. Thus, the heater wire 56 is less likely to break than when joining is performed on the inner side of the transparent plastic layer 75 (refer to FIGS. 7A and 7B).

As shown in FIG. 7B, when the terminal 82 is joined to the connector pin 84 on the inner side of the transparent plastic layer 75, the outer part 84a of the connector pin 84 extends from the inner part 84b in the direction orthogonal to the outer-inner direction and the emblem 72 accordingly becomes large in the orthogonal direction.

In the present embodiment, as shown in FIG. 3, the outer part 32a of the connector pin 32 extends in the outer-inner direction in the same manner as the inner part 32b. As described above, the extension 53 extends inward in the outer-inner direction and overlaps the outer part 32a. At the overlapping portion, the terminal 57 of the heater wire 56 is joined to the outer part 32a. The connector pin 32 and the terminal 57 do not include a portion extending in the direction that is orthogonal to the outer-inner direction. This prevents the portion extending in the above-described orthogonal direction from increasing the width (the dimension in the radial direction) of the frame 31 and prevents the emblem 15 from being enlarged in the orthogonal direction.

When ice and snow adhere to the ornamental surface (outer surface) of the emblem 15, power is supplied to the heater wire 56 through the plug B of the device A, the connector pin 32 of the socket 27, and the terminal 57. The heater wire 56 generates heat when energized. Some of the heat generated by the heater wire 56 is transferred to the ornamental surface (outer surface) of the emblem 15. This melts the ice and snow adhering to the ornamental surface (outer surface) and prevents millimeter waves from being attenuated by the ice and snow.

Particularly, in the present embodiment, the heater seat 51 is arranged at the outermost part of the emblem 15. This allows the heat generated by the heater wire 56 to be easily transferred to the ornamental surface (outer surface) of the emblem 15, thereby melting the ice and snow efficiently.

When millimeter waves are transmitted from the millimeter wave radar device 13, the millimeter waves pass through the base 22, the decorative layer 41, and the transparent plastic layer 35 of the decoration body 21 in the emblem 15 and then pass through the heat-generating body 52 of the heater seat 51 in this order. The passed millimeter waves strike and are reflected by an object at the front of the vehicle including the leading vehicle and pedestrians, and then pass through the heat-generating body 52 of the heater seat 51 and through the transparent plastic layer 35, the decorative layer 41, and the base 22 of the decoration body 21 in this order. The millimeter waves that have passed through the decoration body 21 are received by the millimeter wave radar device 13. From the transmitted and received millimeter waves, the millimeter wave radar device 13 recognizes an object and detects the distance and relative speed between the vehicle 10 and the object.

When visible light is applied to the emblem 15 from the front side of the vehicle 10, the visible light passes through the heat-generating body 52 of the heater seat 51 and the transparent plastic layer 35 of the decoration body 21 and is then reflected on the decorative layer 41. When the emblem 15 is viewed from the front of the vehicle 10, the decorative layer 41 looks located on the inner sides (back sides) of the heat-generating body 52 and the transparent plastic layer 35 through the heat-generating body 52 and the transparent plastic layer 35. In the colored decorative layer 42 of the decorative layer 41, the color of the colored decorative layer 42 is seen. The brilliant decorative layer 43 of the decorative layer 41 looks shiny like metal. In such a manner, the decorative layer 41 decorates the emblem 15. This improves the appearance of the emblem 15 and its surrounding portions.

The above-described reflection of the visible light on the decorative layer 41 is performed on the front side of the millimeter wave radar device 13. The decorative layer 41 functions to cover and hide the millimeter wave radar device 13. Thus, the millimeter wave radar device 13 is hard to see from the front side of the emblem 15. This improves the appearance of the emblem 15 as compared with when the millimeter wave radar device 13 is seen through the emblem 15.

The above-described embodiment may be modified as follows. The above-described present embodiment and the following modifications can be combined as long as the combined modifications remain technically consistent with each other.

The extension 53 may extend from a portion different from the lower edge in the edge of the heat-generating body 52.

The emblem 15 may have the shape of a plate that is not elliptic.

The heater wire 56 in the heat-generating body 52 of the heater seat 51 may be arranged in a pattern that differs from that of the above-described embodiment.

The above-described vehicle exterior part is applicable as long as the vehicle exterior part is incorporated in the vehicle 10 including a device transmitting and receiving electromagnetic waves used to detect an object outside the vehicle 10 and a heater seat is arranged on the outer side of a decoration body. In this case, examples of the electromagnetic waves transmitted and received by the device include millimeter waves and infrared lights.

The device that transmits and receives electromagnetic waves used to detect an object outside the vehicle does not have to be a front-monitoring device. Instead, this device may be a rear monitoring device, a side monitoring device for the front part, or a side monitoring device for the rear part. In this case, the vehicle exterior part is arranged in front of the device in the direction in which electromagnetic wave are transmitted.

The above-described vehicle exterior part may be incorporated in a vehicle that does not include a device transmitting and receiving electromagnetic waves used to detect an object outside the vehicle.

The above-described vehicle exterior is applicable to not only an emblem but also a vehicle exterior part that functions to decorate a vehicle, such as an ornament or a mark.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle exterior part comprising:
a decoration body configured to decorate a vehicle;
a heater seat including a seat base and a heater wire, the heater wire being arranged on an inner surface of the seat base and generating heat when energized; and
a connector pin configured to be coupled to a device used to supply power, wherein
the decoration body includes a base and a transparent plastic layer,
the heater seat includes a heat-generating body and an extension, the extension extending from an edge of the heat-generating body,
the base is arranged on an inner side of the transparent plastic layer,
the heat-generating body is arranged on an outer side of the transparent plastic layer,
a section of the heater wire in the extension is a terminal that is electrically connected to the connector pin,
an outer part of the connector pin is embedded in a periphery of the base,
an inner part of the connector pin is exposed from the base,
the extension extends inward in an outer-inner direction in the periphery of the base,
the terminal of the heater wire extends along the extension and inward in the outer-inner direction in the periphery of the base, and
the terminal of the heater wire is joined to the outer part of the connector pin in the periphery of the base.

2. The vehicle exterior part according to claim 1, wherein
the outer part of the connector pin extends in the outer-inner direction,
the extension overlaps the outer part of the connector pin in the periphery of the base, and
the terminal of the heater wire is joined to the outer part of the connector pin at a portion of the extension which overlaps the outer part of the connector pin.

3. The vehicle exterior part according to claim 1, wherein the base includes a base body and an annular frame, the base body being a framework of the base, the frame being embedded in a periphery of the base body,
the outer part of the connector pin is embedded in the frame such that a portion of the outer part of the connector pin is exposed from the frame,
the extension is arranged in the periphery of the base and at a boundary between the frame and the base body, and
the terminal of the heater wire is joined to the portion of the outer part of the connector pin exposed from the frame.

4. The vehicle exterior part according to claim 1, wherein the heater seat is bent at a boundary between the heat-generating body and the extension such that an angle formed by the heat-generating body and the extension is obtuse.

5. The vehicle exterior part according to claim 1, wherein the base includes a base body and an annular frame, the base body being a framework of the base, the frame being embedded in a periphery of the base body,
the extension is arranged in the periphery of the base and at a boundary between the frame and the base body and is substantially parallel to an edge of the periphery.

* * * * *